(12) United States Patent
Hekal

(10) Patent No.: US 6,279,736 B1
(45) Date of Patent: *Aug. 28, 2001

(54) BARRIER PACK HAVING AN ABSORBING AGENT APPLIED TO THE INTERIOR OF THE PACK

(75) Inventor: Ihab M. Hekal, Stamford, CT (US)

(73) Assignee: Capitol Specialty Plastics, Inc., Auburn, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/333,711

(22) Filed: Jun. 15, 1999

Related U.S. Application Data

(63) Continuation-in-part of application No. 09/156,937, filed on Sep. 18, 1998, now Pat. No. 6,194,079, which is a continuation-in-part of application No. 09/087,830, filed on May 29, 1998, now Pat. No. 6,124,006, which is a continuation-in-part of application No. 08/812,315, filed on Mar. 5, 1997, now Pat. No. 6,130,263, which is a continuation-in-part of application No. 08/611,298, filed on Mar. 5, 1996, now Pat. No. 5,911,937, which is a continuation-in-part of application No. 08/424,996, filed on Apr. 19, 1995, now abandoned.

(51) Int. Cl.[7] .............................. B65D 73/00; B65D 81/26
(52) U.S. Cl. ......................... 206/204; 206/538; 206/461; 428/35.7; 428/35.8; 428/36.5
(58) Field of Search ................................... 34/95; 53/111; 206/204, 461, 538; 502/402, 407; 428/446, 458, 35.7, 35.8, 36.5

(56) References Cited

U.S. PATENT DOCUMENTS

| | | |
|---|---|---|
| 3,211,503 * 10/1965 | Barnes | 312/31.2 |
| 3,343,897   9/1967 | Keller . | |
| 3,921,805  11/1975 | Compere . | |
| 3,924,746  12/1975 | Haines . | |
| 4,211,326   7/1980 | Hein et al. . | |
| 4,228,215  10/1980 | Hein, III et al. . | |
| 4,294,361  10/1981 | Margulies et al. . | |
| 4,753,352 *  6/1988 | Dauphin et al. | 206/538 |
| 5,011,019   4/1991 | Satoh et al. . | |
| 5,348,158   9/1994 | Honan et al. . | |
| 5,603,408   2/1997 | Protz, Jr. . | |
| 5,612,367   3/1997 | Tinko . | |
| 5,622,028   4/1997 | Harp . | |
| 5,743,942   4/1998 | Shelley et al. . | |
| 5,765,342   6/1998 | Jensen et al. . | |
| 5,814,337   9/1998 | Merrifield et al. . | |
| 5,817,338  10/1998 | Bergstrand . | |
| 5,911,937 *  6/1999 | Hekal | 264/255 |
| 6,059,860 *  6/1999 | Larson | 95/117 |

\* cited by examiner

Primary Examiner—Jan H. Silbaugh
Assistant Examiner—Suzanne E. McDowell
(74) Attorney, Agent, or Firm—Dreier & Baritz LLP

(57) ABSTRACT

A barrier pack comprising a cover portion bonded to a base portion to form a sealed unit package capable of containing a product wherein the cover portion has at least one cavity and the base portion and/or cover portion has an absorbing agent material applied to the cavity and/or base portion.

14 Claims, 1 Drawing Sheet

BARRIER PACK HAVING AN ABSORBING AGENT APPLIED TO THE INTERIOR OF THE PACK

RELATED APPLICATION

This application is a continuation-in-part of U.S. Ser. No. 09/156,937, filed Sep. 18, 1998, now U.S. Pat No. 6,194,079, which in turn is a continuation-in-part of U.S. Ser. No. 09/087,830, filed May 29, 1998, now U.S. Pat. No. 6,124,006, which in turn is a continuation-in-part of U.S. Ser. No. 08/812,315, filed Mar. 5, 1997, now U.S. Pat. No. 6,130,263, which in turn is a continuation-in-part of U.S. Ser. No. 08/611,298, filed on Mar. 5, 1996, now U.S. Pat. No. 5,911,937, which in turn is a continuation-in-part of U.S. Ser. No. 08/424,996, filed Apr. 19, 1995; now abandoned.

FIELD OF THE INVENTION

This invention relates generally to the use of an absorbing agent applied to the interior of the barrier pack. In one embodiment, the present invention relates to a barrier pack having an absorbing agent that contains a desiccant.

BACKGROUND OF THE INVENTION

Medication in solid form such as tablets, pills, capsules or the like are sometimes dispensed to patients in dispensers having individually sealed compartments or blisters designed to hold a single dose of medication. Such packages permit the handling of only a single dose of medicine at a time, insure patient compliance, and minimize the risk of contamination of the tablet, pill or capsule.

These "blister packs" typically have first and second cardboard layers with a plurality of oversize aligned cutout through each layer. Typically, a cover portion of plastic having a plurality of blisters is placed against and laminated to the first cardboard layer with the blisters extending through the cutouts in that layer, and pills or capsules are placed within the blisters. A layer of foil is typically laminated to the second cardboard layer, and a peel-off backing is then removed from the foil to expose an adhesive surface upon the foil. The adhesive surface is typically then used to bond the first and second cardboard layers into a sandwich, thereby entrapping the pills within the blisters and creating the sealed unit dose pill package. A heated glue or melting techniques may also be used to seal the package.

Since these packages contain opening manipulations which would thwart opening by small children, they are also particularly useful in the field of child resistant strip packaging. The "blister packs" are typically used both by pharmaceutical companies which manufacture the drugs and package them in blister packs, and by smaller health care facilities which use the blister packs for packaging individual doses. These "blister packs" are also manufactured by companies in the business of providing unfilled blister packs for filling by third parties.

SUMMARY OF THE INVENTION

The present invention relates to a barrier pack. In one embodiment, the barrier pack comprises a cover portion bonded to a base portion to form a sealed unit package wherein: (a) the cover portion comprises at least one cavity capable of containing and dispensing a product; (b) the base portion is in relation to the cover portion such that the cavity extends outwardly from the base portion, the base portion comprising an absorbing agent material applied to an interior of the base portion and coextensively aligned with the corresponding cavity of the cover portion.

In another embodiment, the barrier pack comprising a cover portion bonded to a base portion to form a sealed unit package wherein: (a) the cover portion comprises at least one cavity capable of containing and dispensing a product; the cover portion comprising an absorbing agent material applied to an interior portion of the cavity.

The sealable portions of the cover portion are sealed, directly, or indirectly onto the sealable portions of the base portion. The cavities of the cover portion are extended outwardly over the product support portions of the base portion thereby forming at least one space for inserting a product. In one embodiment, the product may be a medicament or pharmaceutical in the form of tablets, capsules, pills or the like.

In another embodiment, the base portion can be peelable or removable from the cover portion to thereby release the product within the space from the barrier pack. In yet another embodiment of the present invention, the base portion may be composed of peelable aluminum material and the cover portion may be composed of polyvinyl chloride (PVC). In another embodiment, the cover portion may also be substantially transparent making the product visible to the user. In a further embodiment, the sealable portions of the cover portion of the present invention may be heat sealable or adhesively sealed, directly or indirectly, onto the sealable portion of the base portion. In still another embodiment, the cavities of the cover portion may be composed of a material that is sufficiently flexible to allow for an inverted state when a sufficient force is exerted on the cavity that results in a sufficient counter-force on the coextensive portion of the base portion to thereby allow access to the product to a user.

In one embodiment, the absorbing agent containing layer of the present invention contains a desiccant. In another embodiment, the absorbing agent containing layer contains a material selected from the group consisting of activated carbon, carbon black, ketcham black and diamond powder. In a further embodiment, the absorbing agent containing layer contains a material selected from the group consisting of absorption microspheres, $BaTiO_3$, $SrTiO_3$, $SiO_2$, $Al_2O_3$, $ZnO$, $TiO_2$, $MnO$, $CuO$, $Sb_2O_3$, silica, calcium oxide and ion exchange resins. In yet another embodiment, the absorbing agent containing layer contains two or more types of absorbing agents. The suitable absorbing agent for the present invention is chosen so as to achieve absorption of the desired vapor or gas for the desired end use (e.g. absorption of moisture, oxygen, carbon dioxide, nitrogen or other undesired gases or vapors).

In still another embodiment, the present invention relates to a method of manufacturing the barrier pack. The method comprises the step of: (a) producing a cover portion comprising at least one cavity; (b) applying an absorbing agent material to an interior of the cavity; (c) placing the product within the cavity of the cover; and (d) sealing a sealable portion of the cover portion to a sealable portion of the base portion and allowing the cavities of the cover layer to be extended outwardly over the product to thereby form a sealed unit package for the product.

BRIEF DESCRIPTION OF THE DRAWINGS

A more complete appreciation of the present invention and many of the attendant advantages thereof will be readily understood by reference to the following description when considered in connection with the accompanying drawings in which.

Figure 1:
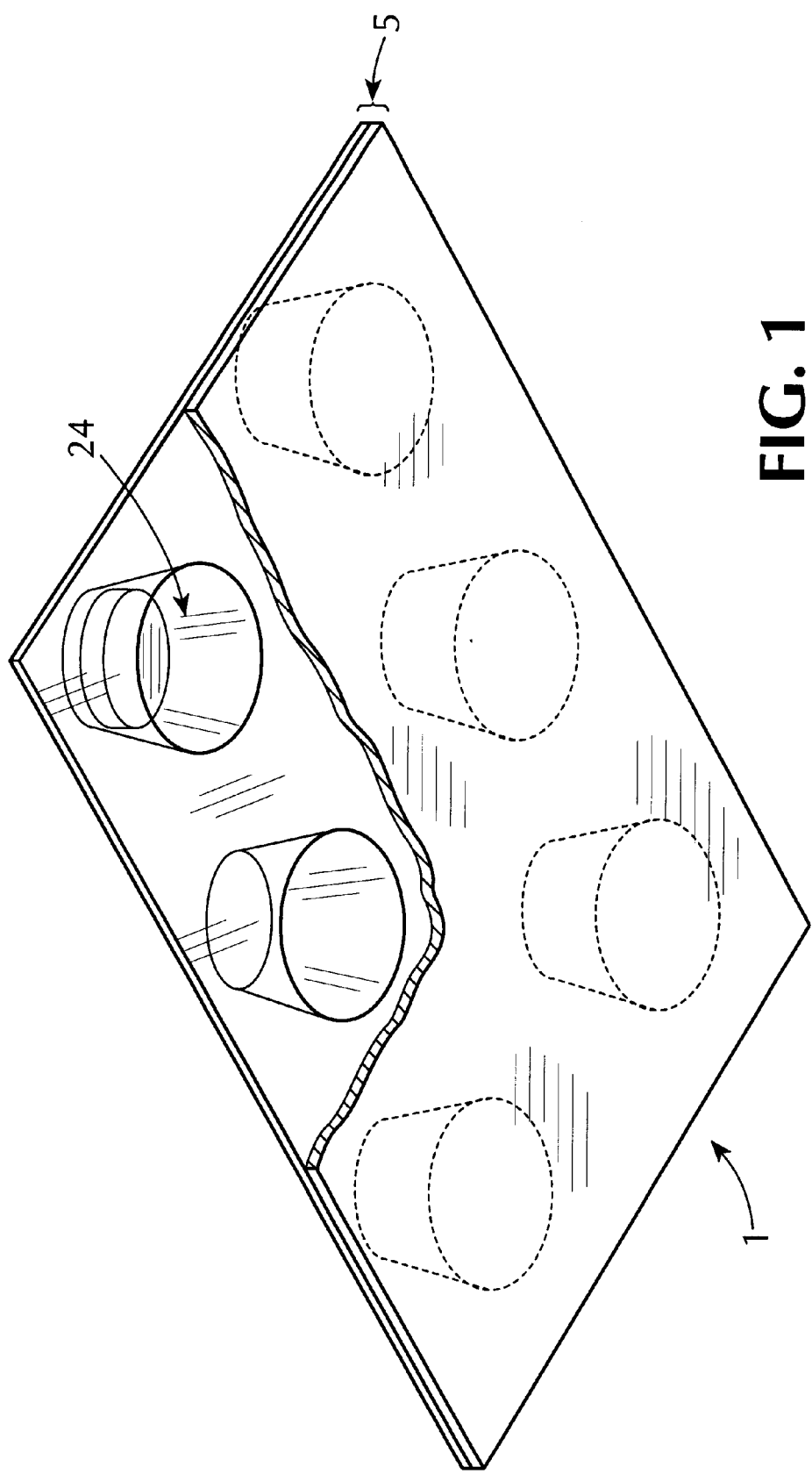
FIG. 1 is a perspective view of one embodiment of the barrier pack of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

For purposes of the present invention, the term "barrier pack" means a package that includes a plurality of individually sealed blisters or compartments (e.g. sealed cavities) for containing a product to be dispensed. Such "barrier packs" are exemplified by what is sometimes referred to in the industry as "blister packs." The term "substantially impermeable" layer means a layer composed of a material that is typically considered by the industry to be a barrier against the desired vapor or gas. For example, for moisture vapor, the vapor barrier of a material is typically measured by its moisture vapor transmission rate ("MVTR") and, for purposes of the present invention, material having an MVTR below about 0.25 grams of moisture/mm thick/$m^2$ surface area/day (measured by ASTM F1249) is considered to be a "substantially impermeable" material. The term "substantially permeable" layer means a layer composed of a material that is typically considered by the industry to transfer an acceptable amount of the desired vapor or gas through the material. For example, for moisture vapor, the MVTR above about 1.0 grams of moisture/mm thick/$m^2$ surface area/day (measured by ASTM-F1249) is considered to be a "substantially permeable" material. The term "bonded" means to hold two portions directly or indirectly together. Suitable bonding methods include gluing and heat-sealing. For purposes of the present invention, the barrier pack may have the cover portion "bonded" to the base portion by sealing (e.g. laminating) both or either portions to one or more intermediate layers and, subsequently, joining these layers to the other portion. The term "applied" includes coated, spread, dipped, sprayed, painted and deposited.

Referring now to the drawings wherein like reference numbers designate identical corresponding parts throughout the several views, and more particularly to FIGS. 1 wherein one embodiment of the barrier pack 1 of the present invention is illustrated. The barrier pack 1 comprises a base portion 5 having an absorbing agent material applied to the base portion and coextensively aligned with the corresponding cavity of the cover portion. The cover portion 20 has an extendible portions (i.e. cavity) 24 wherein a product 4 such as a pharmaceutical or medicament in the form of a pill, capsule or tablet. In one embodiment the base portion 10 can be composed of a peelable aluminum material and the cover portion 20 may be composed of polyvinyl chloride. In another embodiment, the cover and base portions, 20 and 10 respectively, may be heat sealable plastic. The cover portion 10 may be transparent making the product visible to a user. In a further embodiment, the cavity 24 of the cover portion 20 may be adopted to being pushed inward to an inverted state in order to separate the base portion 10 from the barrier pack 1 thereby releasing the product 4 from within the cavity 24. In still a further embodiment, the barrier pack of the present invention may have a pull tab for separating the base portion 10 from the cover portion 20 thereby allowing the user access to the product 4.

The cover portion 20 is overlaid by a base portion 10 which keeps the contents of the cavities in pristine condition. The two sheets are heat sealed completely about each cavity.

In one embodiment, the base portion 10 should be relatively stiff in contrast to the cover portion 20 which desirably should be somewhat pliable. The desired degrees of stiffness in the two sheets can thus be achieved by use of thicker material in the cover portion than that used in the base sheet.

In still yet a further embodiment, the base portion 10 is an aluminum foil. Access to the product may be achieved by applying finger pressure to the relatively thin, less rigid base sheet to urge the contained product against the foil with sufficient force to tear the foil.

In one embodiment where the cover portion is substantially impermeable to moisture vapor, the cover portion 20 may comprise a laminate structure in which, prior to thermoforming, the lamination comprises polyvinyl chloride (PVC) about 2 mils to about 8 mils thick and a sheet of polymeric material, such as high density polyethylene (HDPE), that has been fluid compression rolled to about 2 to about 6 mils, with a preferred thickness of about 3 mils, which is about ⅓ of its original thickness. Rolling the polymeric material to ⅓ its original thickness provides thermoformability in the resulting laminate structure as compared to full fluid compression rolling which produces a non-thermoformable material. The sheets are then laminated by adhesion lamination or other suitable lamination methods.

Other suitable substantially moisture vapor impermeable material may include: (1) a laminate structure comprising laminae of PVC and chlorotrifluoroethylene; and (2) a PVC/polyvinylidene chloride (PVDC) combination. It must be noted that the thickness of the above-mentioned materials may have to be increased to decrease its permeability rate and thus, achieve the desired impermeability.

In addition, in another embodiment, the absorbing agent material may be a monolithic composition having interconnecting channels. Hydrophilic agents (e.g., channeling agents) may be combined with a water-insoluble polymer that is used in the formation of shaped articles. In practice, in one embodiment the water-insoluble polymer base into which the hydrophilic agent is blended includes, as examples, any polyethylene and polypropylene.

In one embodiment, an absorbing agent and hydrophilic agent are added to the water-insoluble polymer when the polymer is in a molten state or before the polymer is in the molten state, so that the absorbing agent and hydrophilic agent may be blended and thoroughly mixed throughout the polymer to insure that the blend is uniformly mixed before reaching the melt phase. For example, such a technique is useful when the absorbing agent, hydrophilic agent and polymer are all powders.

In another embodiment, the hydrophilic agent and polymer are mixed prior to adding the absorbing agent. The hydrophilic agent is added either before the polymer is in the molten state or after the polymer is in the molten state. For example, the absorbing agent may be added to the polymer during the thermal process of the absorbing agent material.

After thorough blending and processing, following by cooling, the hydrophilic agent forms interconnecting channels that act as transmission communicating passages throughout the polymer.

In addition, the absorbing agent material is monolithic and the water-insoluble polymer, hydrophilic agent and absorbing agent form a three phase system.

For purposes of the present invention, the term "phase" means a portion of a physical system that is uniform throughout, has defined boundaries and, in principle, be separated physically from other phases. The term "interconnecting channels" means channels that penetrate through the water-insoluble polymer and that may be interconnected to each other. The term "water-insoluble polymer" means a polymer having a solubility in water below about 0.1% at 25° C. and atmospheric pressure. The term "hydrophilic agent" is defined as a material that is not substantially cross-linked and that has a solubility in water of at least about 1% at 25° C. and atmospheric pressure. Suitable hydrophilic agents include "channeling" agents. The term "monolithic composition" means a composition that does not consist of two or more discrete macroscopic layers. Moreover, for purposes of the present invention, the term "melting point" is defined as the first order transition point of the material determined by DSC. The term "not mutually soluble" means immiscible with each other.

In one embodiment, suitable hydrophilic agents of the present invention include polyglycols such as poly(ethylene glycol) and poly(propylene glycol) and mixtures thereof. Other suitable materials include EVOH, glycerin, pentaerithritol, PVOH, polyvinylpyrollidine, vinylpyrollidone or poly(N-methyl pyrollidone), and saccharide based compounds such as glucose, fructose, and their alcohols, mannitol, dextrin and hydrolyzed starch being suitable for the purposes of the present invention since they are hydrophilic compounds.

In another embodiment, suitable hydrophilic agents of the present invention may also include any hydrophilic material wherein, during processing, the hydrophilic agent is heated above its melt point upon melt mixing, and subsequently upon cooling separates from the polymer to form the interconnecting channeled structure of the present invention and a three phase system of a water-insoluble polymer, hydrophilic agent and the absorbing agent.

Various types of absorbing agents may be used with the present invention. In one embodiment, the absorbing agent of the present invention includes a desiccating agent.

In one embodiment relating to absorbing agent having a relatively fine particle size, many small interconnecting channels throughout the polymer should be produced, as opposed to a few large interconnecting channels that will expose less surface area within the polymer. In one embodiment, dimer agents such as polypropylene maleic anhydride, or any plasticizer, may be optionally added to the mixture reducing viscosities and increasing the mixing compatibility of the polymer and hydrophilic agent.

In yet another embodiment, desiccating agents are selected having a polarity that causes an affinity between the desiccant and the hydrophilic agent. An example of such a polar desiccant is silica which is more compatible with the hydrophilic agent than it is typically with the water-insoluble polymer. For this reason, during the separating process when the interconnecting channels are formed throughout the polymer, it is believed that the desiccating agent will congregate toward the hydrophilic agent domains to which it has a greater affinity. In this manner, it is theorized that the hydrophilic agent is permitted to act as a bridge between moisture located exteriorly to the polymer structure and the desiccant that is located within the polymer. This is particularly true with respect to a desiccant that is bound within the hydrophilic agent filled passages. In a further embodiment, polar plasticizers such as glycerin may be further added to the mixture which enhance the dispersion or mixing of the desiccant into the hydrophilic agent. The desiccating agent which is primarily concentrated within the hydrophilic agent picks up the moisture from the transmitting hydrophilic agent and retains it therein. In this way, the moisture is quickly pulled throughout the interconnecting channels and made available to the desiccating particles or agents which are dispersed throughout the polymer.

In one embodiment, the water-insoluble polymer of the present invention may be any thermoplastic material. Examples of suitable thermoplastic materials include polyolefins such as polypropylene and polyethylene, polyisoprene, polybutadiene, polybutene, polysiloxane, polycarbonates, polyamides, ethylene-vinyl acetate copolymers, ethylene-methacrylate copolymer, poly(vinyl chloride), polystyrene, polyesters, polyanhydrides, polyacrylonitrile, polysulfones, polyacrylic ester, acrylic, polyurethane and polyacetal, or copolymers or mixtures thereof.

In an embodiment, the water-insoluble polymer may be an adhesive such as light curing adhesive, epoxy and/or hot melt adhesive. An example, when an epoxy is employed, the two components are selected based on the desired curing time and temperature and the bond and peel strength. In another example, an adhesive may be selected that is ultraviolet or visible light cured. The UV/visible light sources may be employed to cure the polymer in seconds. For example, the adhesive may be applied to the cover and/or base portion and, downstream, the adhesive is then exposed to the UV/visible light sources to cure the polymer.

In another embodiment, the absorbing agent material would include a desiccant such as molecular sieves, polypropylene and polyglycol. The amounts of the various components would be for example, from about 30–80 wt %, or from about 40–70 wt % of the desiccant, or about 60 wt %; from about 20–40 wt % of the polypropylene, e.g. polypropylene homopolymer available from Exxon [3505], having a melt flow of 400, or about 30 wt %; and from about 5–20 wt % of the polyglycol, e.g., poly[ethylene propylene glycol] available from Dow (15–200), or about 10 wt %.

In yet another embodiment of the absorbing agent material, the components are first dry mixed in a mixer such as a Henschel, and then fed to a compounder. A Leistritz twin screw extruder, for example, or a Werner Pfleider mixer can be used to achieve a good melt mix at about 140° C. to about 170° C. The melt can then be either extruded to form, for example, a film or converted into pellets using dry air cooling on a vibrating conveyer. The formed pellets, containing channels, can, for example, then be either injection molded into beads, sieves, or co-injected with polypropylene.

In another example, a blend of about 34.88% (w/w) of polypropylene (Exxon Chemical, tradename Escorene® polypropylene 3505G), about 11.96% (w/w/) of poly (ethylene glycol) (Dow Chemical, tradename E-4500), about 52.82% (w/w/) of a desiccant of molecular sieve (Elf Atochem, tradename Siliporite® molecular sieve, 4 Angstrom) and about 0.34% (w/w) of a grey colorant was sufficiently mixed to produce a uniform blend. The blend was then fed through a Leistritz twin screw extruder at temperatures in the sixteen zones ranging from about 145° C. to about 165° C., at a feed rate of about 50 lbs/hr at a screw speed of about 460 rpm and a six inch die. The extruded composition was then fed through a three roll hot press at temperatures ranging from about 85° C. to about 92° C. to produce a film of about 4 mil.

One embodiment of the present invention includes a process for producing the absorbing agent material. In one embodiment, the process comprises blending a water-insoluble polymer and a hydrophilic agent. Either prior to blending the hydrophilic agent or after blending the hydrophilic agent, the absorbing agent is blended into the polymer so that the additive is uniformly distributed within the polymer and the hydrophilic agent is distributed within the polymer. Subsequently, after the composition is solidified, the result is that the hydrophilic agent forms interconnecting channels in the composition through which the desired property is transmitted through the polymer to the absorbing agent within the composition. In another embodiment, the hydrophilic agent and absorbing agent are all thoroughly mixed in dry powder form, and then the polymer blend is melted and formed into a desired shape by molding. Interconnecting channels are formed in the composition through which the desired property is transmitted through the polymer to the absorbing agent within the composition.

Other substantially permeable material may include a very thin (e.g. 1 mil or less) layer of the polymer such as PVC. In one embodiment where the substantially permeable layer is thin, the layer may be considered a coating. Consequently, for purposes of the present invention, the words "coating" and "layer" may be used interchangeably.

In one embodiment, the pocket or cavity draw depths are limited to about ½ inch for a ⅞ inch diameter circle, with area ratios ranging up to about 1:3. (Area ratio is the ratio of the initial area from which the pocket or blister 13 is drawn to the final area of the surface of the pocket or cavity). However, the draw depth and shape may be changed to fit the size and shape of the desired product.

The plastics that are suitable for the base and cover portion of the barrier package 1 of the present invention, may include, but are not limited to, thermoplastics or thermosets. Thermoplastics consists of long chain molecules. Examples of suitable thermoplastic materials include polyolefins such as polypropylene and polyethylene, polycarbonates, polyamides, ethylene-vinyl acetate copolymers, ethylene-methacrylate copolymer, polyvinyl chloride, polystyrene, polyester, polyester amide, polyacrylic ester, acrylic, polyurethane and polyacetal, or mixtures thereof. Thermoset plastics contain infinite three dimensional networks. Examples of thermosets include epoxy polyurethene and polyester.

In one embodiment where the absorbing agent is a desiccant, various types of desiccating agents are known in the art and may be used with the present invention. In general, there are three primary types of desiccating agents that may be used with the present invention.

The first type comprises chemical compounds that form crystals that contain water. Examples of such desiccant are anhydrous salts which tend to absorb water or moisture and form a stable salt. In this reaction with the moisture, a stable compound is formed within which the moisture is held and prevented from release.

The second type of desiccant compounds are those which are considered to be reactive. These compounds typically undergo a chemical reaction with water or moisture and form new compounds within which the water is combined. These newly formed compounds are generally irreversible at low temperature and require a significant amount of energy to be regenerated so that they may be reused as a desiccant. These reactive type desiccants are mainly used in solvent drying and as additives to polymers which must themselves be maintained in a moisture reduced state. One application in which these reactive type compounds are particularly suitable was described above with respect to the multi-layer sheeting within which a layer of EVOH is laminated between two shielding layers of what is normally moisture impermeable material such as polypropylene or polyethylene. As earlier noted, however, these types of sheeting or wrap are used to package food products which must subsequently be sterilized in a retorting process wherein the packaged good is exposed to hot sterilizing steam. At the elevated temperatures, the exterior layers permit moisture to pass therethrough and compromise the oxygen barrier effectiveness of the EVOH interior layer. Because of the reactive desiccant that has been entrained that moisture is absorbed into the desiccant and retained therein away from the EVOH layer thereby allowing the EVOH layer to maintain its oxygen barrier characteristics.

The third type of desiccants obtain their moisture absorbing capabilities through physical absorption. The absorption process is accomplished because of a fine capillary morphology of the desiccant particles which pulls moisture therethrough. The pore size of the capillaries, as well as the capillaries' density determine the absorption properties of the desiccant. Examples ofthese physical absorption desiccants include molecular sieves, silica gels, clays and starches. Because these types of physical absorption desiccants are both inert and non-water soluble, they are preferred for many applications. Among other reasons, these innocuous characteristics are particularly compatible with food products and medicinal products that may be enclosed within containers formed from the desiccant entrained polymers, or at least exposed thereto. Suitable desiccating agent include silica gel, molecular sieve and naturally occurring clay compounds which would also include montmorillimite clay.

Suitable absorbing agents may also include: (1) metals and alloys such as, but not limited to, nickel, cooper, aluminum, silicon, solder, silver, gold; (2) metal-plated particulate such as silver-plated cooper, silver-placed nickel, silver-plated glass microspheres; (3) inorganics such as $BaTiO_3$, $SrTiO_3$, $SiO_2$, $Al_2O_3$, ZnO, $TiO_2$, MnO, CuO, $Sb_2O_3$ WC, fused silica, fumed silica, amorphous fuse silica, sol-gel silica, sol-gel titanates, mixed titanates, ion exchange resins, lithium-containing ceramics, hollow glass microspheres; (4) carbon-based materials such as carbon, activated charcoal, carbon black, ketchem black, diamond powder; and (5) elastomers, such as polybutadiene, polysiloxane, and semi-metals, ceramic.

It is believed that the higher the amount of absorbing agents in the absorbing agent material, the greater the absorption capacity will be of the portion containing the absorbing agents. However, the higher absorbing agent concentration may cause the portion to be more brittle and the mixture to be more difficult to either thermally from, extrude or injection mold. For the reason, in one embodiment, it is believed that a maximum absorbing agent load is about 80 percent by weight with respect to the absorbing agent material. In another embodiment, the desiccant loading level can range from 10% to 20%, 20% to 40% and 40% to 60% by weight with respect to the absorbing agent material.

In one embodiment, the portion of the barrier pack having the layer containing the absorbing agent material may be produced by placing the absorbing agent material on a first layer and thus, producing a second layer, i.e. the absorbing agent material layer. Then, a third layer is placed over the absorbing agent containing layer to produce a composite material comprising three layers. In another embodiment, the second layer (i.e. the absorbing agent material layer) would be placed on one side of a continuous web of material. A third layer would then be placed on top of the side of the web having the absorbing agent material layer. The three layer composite produced would then be laminated together using suitable equipment such as a system of heated rollers that would both calender the composite and laminate the composite. Subsequently, in yet another embodiment where the cover portion comprises the composite material, the composite material would then be formed into individual cavities (e.g. "blisters"). In an embodiment where the base portion comprises the composite material, after the product is placed in the cavity, the base portion would then be placed over the cover portion to form a sealed unit for the product.

In yet another embodiment, the absorbing agent material may be applied to either or both the cavity and the base portion by: (a) coating the material on the cavity and/or base portion, which is co-extensive with the cavity; (b) spreading the material on the cavity and/or base portion, which is coextensive with the cavity; (c) dripping the material on the cavity and/or base portion, which is coextensive with the cavity; (d) spraying the material on the cavity and/or base portion, which is coextensive with the cavity; (e) painting the material on the cavity and/or base portion, which is coextensive with the cavity; and/or (f) depositing the material on the cavity and/or base portion, which is coextensive with the cavity. Suitable equipment for applying the absorbing agent material includes using a nozzle and brush.

In an embodiment where the absorbing agent is a desiccant, suitable forms of desiccants to be used in the present invention include the "raw" desiccant (e.g. powder silica gel or powder molecular sieve), desiccant entrained in a polymer, desiccant bonded to a material, desiccant powder dispersed in a material that holds the powder together but does not substantially inhibit its moisture absorption capability, and other forms of desiccant products. As well, suitable forms of desiccants include particles, shreds, beads, discs, fibers, slurry and film.

Numerous modifications and variations of the present invention are possible in light of the above teachings. It is therefore to be understood that within the scope of the attendant claims appended hereto, this invention may be protected otherwise than or specifically disclosed herein.

What is claimed is:

1. A barrier pack comprising a cover portion bonded to a base portion to form a sealed unit package for containing a product:
    (a) the cover portion comprises at least one cavity, the cover portion comprising an absorbing agent material applied to an interior portion of the cavity, wherein the absorbing agent material is formed by combining at least the following components to form a monolithic composition: an absorbing agent, a water-insoluble polymer and hydrophilic agent; and wherein the composition comprises at least three phases and has interconnecting channels with the absorbing agent in or adjacent to these channels; and
    (b) the base portion is in relation to the cover portion such that the cavity extends outwardly from the base portion.

2. The barrier pack of claim 1 wherein the polymer is selected from the group consisting of epoxy, light curing adhesive, hot melt adhesives and cold melt adhesives.

3. The barrier pack of claim 2 wherein the absorbing agent is a desiccant selected from the group consisting of silica gel and molecular sieve.

4. The barrier pack of claim 2 wherein the absorbing agent is selected from the group consisting of activated carbon, carbon black, ketcham black and diamond powder.

5. The barrier pack of claim 2 wherein the absorbing agent is selected from the group consisting of absorption microspheres, $BaTiO_3$, $SrTiO_3$, $SiO_2$, $Al_2O_3$, ZnO, $TiO_2$, MnO, CuO, $Sb_2O_3$, silica, calcium oxide and ion exchange resins.

6. The barrier pack of claim 1 wherein the absorbing agent is a desiccant selected from the group consisting of silica gel and molecular sieve.

7. The barrier pack of claim 1 wherein the absorbing agent is selected from the group consisting of activated carbon, carbon black, ketcham black and diamond powder.

8. The barrier pack of claim 1 wherein the absorbing agent is selected from the group consisting of absorption microspheres, $BaTiO_3$, $SrTiO_3$, $SiO_2$, $Al_2O_3$, ZnO, $TiO_2$, MnO, CuO, $Sb_2O_3$, silica, calcium oxide and ion exchange resins.

9. A barrier pack comprising a cover portion bonded to a base portion to form a sealed unit package for containing a product:
    (a) the cover portion comprises at least one cavity; and
    (b) the base portion comprising an absorbing agent material applied to an interior of the base portion and coextensively aligned with the corresponding cavity of the cover portion, wherein the absorbing agent material is formed by combining at least the following components to form a monolithic composition: an absorbing agent, a water-insoluble polymer and hydrophilic agent; and wherein the composition comprises at least three phases and has interconnecting channels with the absorbing agent in or adjacent to these channels.

10. The barrier pack of claim 9 wherein the polymer is selected from the group consisting of epoxy, light curing adhesives, hot melt adhesives and cold melt adhesives.

11. The barrier pack of claim 10 wherein the absorbing agent is a desiccant selected from the group consisting of activated carbon, carbon black, ketcham black and diamond powder.

12. The barrier pack of claim 10 wherein the absorbing agent is selected from the group consisting of activated carbon, carbon black, ketcham black and diamond powder.

13. The barrier pack of claim 10 wherein the absorbing agent is selected from the group consisting of absorption microspheres, $BaTiO_3$, $SrTiO_3$, $SiO_2$, $Al_2O_3$, ZnO, $TiO_2$, MnO, CuO, $Sb_2O_3$, silica, calcium oxide and ion exchange resins.

14. The barrier pack of claim 9 wherein the absorbing agent is a desiccant selected from the group consisting of silica gel and molecular sieve.

* * * * *